(12) United States Patent
Ganeshkumar

(10) Patent No.: US 10,438,605 B1
(45) Date of Patent: Oct. 8, 2019

(54) ECHO CONTROL IN BINAURAL ADAPTIVE NOISE CANCELLATION SYSTEMS IN HEADSETS

(71) Applicant: BOSE CORPORATION, Framingham, MA (US)

(72) Inventor: Alaganandan Ganeshkumar, North Attleboro, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/925,102

(22) Filed: Mar. 19, 2018

(51) Int. Cl.
*G10L 21/0208* (2013.01)
*H04R 1/10* (2006.01)

(52) U.S. Cl.
CPC ........ *G10L 21/0208* (2013.01); *H04R 1/1083* (2013.01); *G10L 2021/02082* (2013.01); *H04R 2410/05* (2013.01)

(58) Field of Classification Search
None
See application file for complete search history.

(56) References Cited

U.S. PATENT DOCUMENTS

| | | | |
|---|---|---|---|
| 6,339,706 B1 | 1/2002 | Tillgren et al. | |
| 6,363,349 B1 | 3/2002 | Urs et al. | |
| 6,453,291 B1 | 9/2002 | Ashley | |
| 7,103,550 B2 | 9/2006 | Gallagher et al. | |
| 7,359,504 B1 | 4/2008 | Reuss et al. | |
| 7,412,070 B2 | 8/2008 | Kleinschmidt et al. | |
| 8,184,822 B2 | 5/2012 | Carreras et al. | |
| 8,611,560 B2 | 12/2013 | Goldstein et al. | |
| 8,620,650 B2 | 12/2013 | Walters et al. | |
| 8,625,819 B2 | 1/2014 | Goldstein et al. | |
| 8,626,246 B2 | 1/2014 | Shostak | |
| 8,798,283 B2 | 8/2014 | Gauger, Jr. et al. | |
| 8,805,692 B2 | 8/2014 | Goldstein | |

(Continued)

FOREIGN PATENT DOCUMENTS

| | | |
|---|---|---|
| EP | 2884763 A1 | 6/2015 |
| EP | 2914016 A1 | 9/2015 |

(Continued)

OTHER PUBLICATIONS

International Search Report and Written Opinion in PCT/US2018/023072 dated Jun. 6, 2018.

(Continued)

*Primary Examiner* — Qin Zhu
(74) *Attorney, Agent, or Firm* — Bose Corporation

(57) ABSTRACT

A headphone, headphone system, and method is provided to enhance speech pick-up from a user of a headphone, by removing noise and echo components. A primary signal is derived from at least one microphone associated with the headphone. The primary signal is configured to include a component of speech from the user. A noise reference signal is representative of acoustic noise in the environment of the headphone. A playback signal is provided by an audio source to be rendered by an acoustic driver associated with the headphone, and an echo reference signal is representative of the playback signal. The systems and methods filter the primary signal to reduce noise and echo components, based on the noise reference signal and the echo reference signal, respectively, to provide a voice estimate signal.

18 Claims, 9 Drawing Sheets

(56) References Cited

U.S. PATENT DOCUMENTS

| | | |
|---|---|---|
| 8,880,396 B1 | 11/2014 | Laroche et al. |
| 9,066,167 B2 | 6/2015 | Goldstein et al. |
| 9,076,447 B2 | 7/2015 | Nandy et al. |
| 9,204,214 B2 | 12/2015 | Usher et al. |
| 9,401,158 B1 | 7/2016 | Yen et al. |
| 9,832,569 B1 | 11/2017 | Ayrapetian et al. |
| 9,843,861 B1 | 12/2017 | Termeulen |
| 2005/0152559 A1 | 7/2005 | Gierl et al. |
| 2007/0172079 A1 | 7/2007 | Christoph |
| 2008/0031475 A1 | 2/2008 | Goldstein |
| 2009/0304188 A1 | 12/2009 | Mejia et al. |
| 2010/0028134 A1* | 2/2010 | Slapak .............. F24F 13/24 |
| | | 415/119 |
| 2010/0086122 A1* | 4/2010 | Takada ............. H04M 9/082 |
| | | 379/406.08 |
| 2011/0211706 A1* | 9/2011 | Tanaka ............. H04M 9/082 |
| | | 381/66 |
| 2012/0020480 A1 | 1/2012 | Visser et al. |
| 2012/0057722 A1 | 3/2012 | Osako et al. |
| 2012/0250882 A1 | 10/2012 | Mohammad et al. |
| 2014/0081644 A1 | 3/2014 | Usher et al. |
| 2014/0093091 A1* | 4/2014 | Dusan ............... H04R 1/1083 |
| | | 381/74 |
| 2014/0095157 A1 | 4/2014 | Usher et al. |
| 2014/0119557 A1 | 5/2014 | Goldstein |
| 2014/0119558 A1 | 5/2014 | Goldstein |
| 2014/0119559 A1 | 5/2014 | Goldstein |
| 2014/0119574 A1 | 5/2014 | Goldstein |
| 2014/0122073 A1 | 5/2014 | Goldstein |
| 2014/0122092 A1 | 5/2014 | Goldstein |
| 2014/0123008 A1 | 5/2014 | Goldstein |
| 2014/0123009 A1 | 5/2014 | Goldstein |
| 2014/0123010 A1 | 5/2014 | Goldstein |
| 2014/0126729 A1* | 5/2014 | Heiman ............. H04R 1/00 |
| | | 381/58 |
| 2014/0172421 A1* | 6/2014 | Liu ..................... H04R 1/1083 |
| | | 704/227 |
| 2014/0244273 A1 | 8/2014 | Laroche et al. |
| 2014/0268016 A1 | 9/2014 | Chow et al. |
| 2014/0278393 A1 | 9/2014 | Ivanov |
| 2014/0350943 A1 | 11/2014 | Goldstein |
| 2015/0104031 A1* | 4/2015 | Park ................... G10K 11/178 |
| | | 381/71.6 |
| 2015/0112689 A1 | 4/2015 | Mandy et al. |
| 2015/0139428 A1 | 5/2015 | Reining et al. |
| 2015/0230026 A1 | 8/2015 | Eichfeld et al. |
| 2015/0334484 A1 | 11/2015 | Usher et al. |
| 2016/0019907 A1* | 1/2016 | Buck ................. H04M 9/082 |
| | | 704/226 |
| 2016/0019909 A1* | 1/2016 | Shi .................... H04M 9/082 |
| | | 704/226 |
| 2016/0088391 A1 | 3/2016 | Usher et al. |
| 2016/0098921 A1 | 4/2016 | Qutub et al. |
| 2016/0162469 A1 | 6/2016 | Santos |
| 2016/0165361 A1 | 6/2016 | Miller et al. |
| 2016/0189220 A1 | 6/2016 | Verma |
| 2016/0196818 A1* | 7/2016 | Christoph ......... G10K 11/1786 |
| | | 381/71.6 |
| 2016/0196838 A1 | 7/2016 | Rossum et al. |
| 2016/0210051 A1 | 7/2016 | Qutub et al. |
| 2016/0241948 A1* | 8/2016 | Liu .................... H04M 1/19 |
| 2016/0267899 A1* | 9/2016 | Gauger, Jr. ........ G10K 11/175 |
| 2017/0214800 A1* | 7/2017 | Nagai ................ H04M 9/082 |
| 2017/0263267 A1 | 9/2017 | Dusan et al. |

FOREIGN PATENT DOCUMENTS

| | | |
|---|---|---|
| EP | 3007170 A1 | 4/2016 |
| WO | 2009132646 A1 | 11/2009 |
| WO | 201694418 A1 | 6/2016 |
| WO | 2016089745 A1 | 6/2016 |
| WO | 2018175317 A1 | 9/2018 |

OTHER PUBLICATIONS

Gillett, P.W. "Head Mounted Microphone Arrays" (2009), Blacksburg, VA. Retrieved from the Internet: https://vtechworks.lib.vt.edu/bitstream/handle/10919/28867/GillettDissertation2.pdf?sequence=1&isAllowed=y.

International Search Report and Written Opinion in application No. PCT/US2018/023136 dated Jul. 26, 2018.

International Search Report and Written Opinion in application No. PCT/US2018/035040 dated Aug. 27, 2018.

International Search Report and Written Opinion dated Jun. 21, 2019 for PCT/US2019/022693.

* cited by examiner

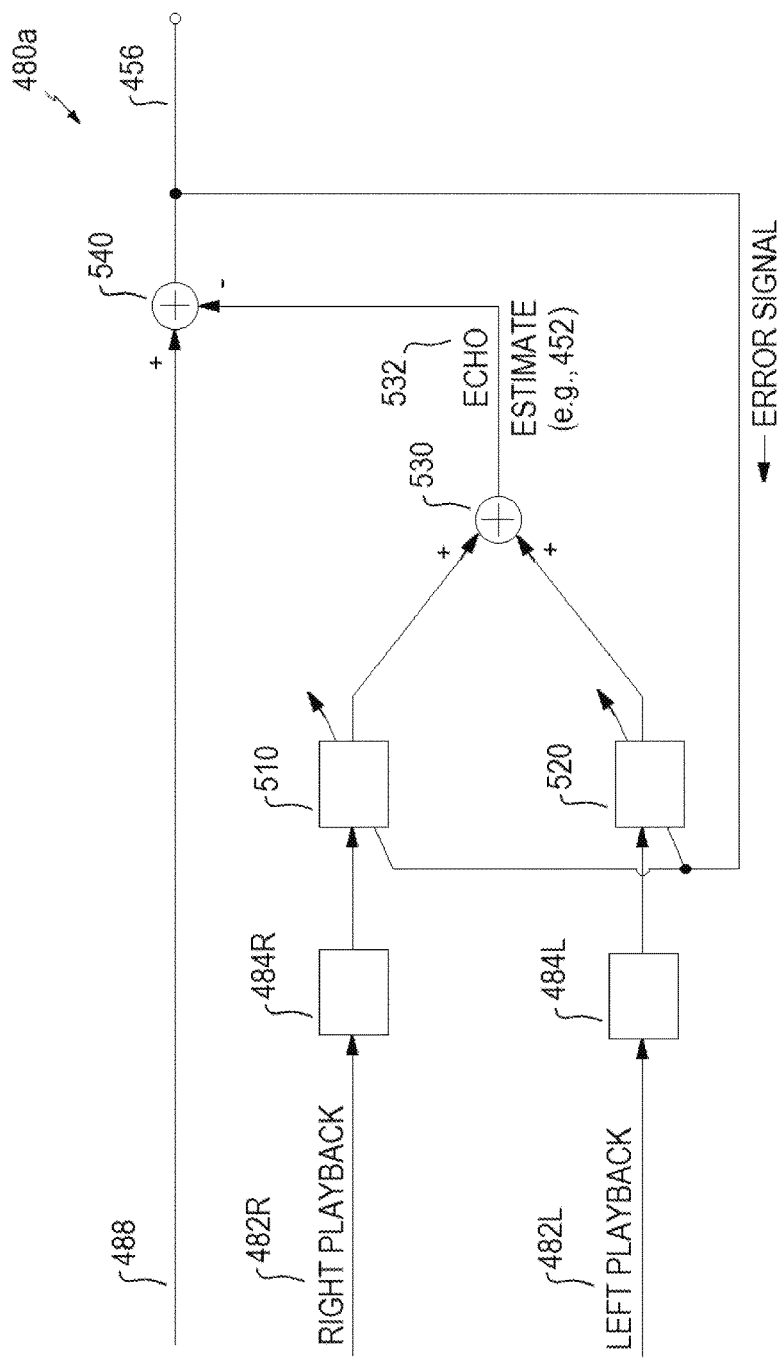

ECHO CONTROL IN BINAURAL ADAPTIVE NOISE CANCELLATION SYSTEMS IN HEADSETS

BACKGROUND

Headphone systems are used in numerous environments and for various purposes, including entertainment such as gaming or listening to music, productivity such as phone calls, and professional such as aviation communications or sound studio monitoring, to name a few. Different environments and purposes may have different requirements for fidelity, noise isolation, echo reduction, noise reduction, voice pick-up, and the like. Some environments require accurate communication despite high background noise or echo, such as environments involving industrial equipment, aviation operations, and sporting events. Some applications, such as voice communications and voice recognition, exhibit increased performance when a user's voice is more clearly separated, or isolated, from other noises and echoes.

Accordingly, in some environments and in some applications it may be desirable to reduce or remove noise and/or echo components from one or more microphone signals, for enhanced capture or pick-up of a user's voice.

SUMMARY

Aspects and examples are directed to systems and methods that pick-up speech activity of a user and reduce other signal components, such as echo components that include portions of an audio signal delivered to one or more speakers of the headphone system, as well as background noise and other talkers, to enhance the user's speech components in an output signal. The systems and methods provide enhanced isolation of the user's voice by removing or reducing signals that are not due to the user speaking. Noise-reduced voice signals may be beneficially applied to audio recording, communications such as telephone calls, radio communications, voice recognition systems, virtual personal assistants (VPA), and the like. Aspects and examples disclosed herein allow a headphone to pick-up and enhance a user's voice so the user may use such applications with improved performance and/or in noisy environments.

According to one aspect, a method of enhancing speech of a headphone user is provided and includes receiving a primary signal derived from at least one microphone associated with the headphone, the primary signal configured to include a component of speech from the user, receiving an echo reference signal representative of at least one playback signal, the at least one playback signal provided by an audio source to be rendered into an acoustic signal by an acoustic driver associated with the headphone, receiving a noise reference signal representative of acoustic noise in the environment of the headphone, and filtering the primary signal to reduce components correlated to the noise reference signal and to reduce components correlated to the echo reference signal, to provide a voice estimate signal.

Certain examples include generating the echo reference signal by pre-filtering the at least one playback signal. Pre-filtering the at least one playback signal may include filtering by a set of pre-determined filter coefficients representative of a static echo transfer function.

In some examples, filtering the primary signal to reduce components correlated to the echo reference signal includes generating an estimated echo signal by filtering the echo reference signal using both a set of initial filter coefficients and a set of adapted filter coefficients, and subtracting the estimated echo signal from the primary signal.

In certain examples, the primary signal is a right side primary signal and the echo reference signal is a right side echo reference signal and further comprising receiving a left side primary signal, receiving a left side echo reference signal, and filtering the left primary signal to reduce components correlated to the left side echo reference signal.

Some examples include generating the primary signal by array processing a plurality of signals from a plurality of microphones to enhance a response to acoustic signals originating in the direction of the user's mouth.

Various examples include generating the noise reference signal by array processing a plurality of signals from a plurality of microphones to reduce a response to acoustic signals originating in the direction of the user's mouth.

Certain examples include generating the primary signal by combining a first signal from a left side of the headphone with a second signal from a right side of the headphone.

According to some examples, filtering the primary signal includes filtering the echo reference signal to generate an estimated echo signal and subtracting the estimated echo signal from the primary signal. Filtering the echo reference signal may comprise adaptively adjusting filter coefficients during periods of time when a double talk condition is not detected, in some examples.

According to another aspect, an audio system is provided that includes at least one left microphone coupled to a left earpiece to provide a left primary signal, at least one right microphone coupled to a right earpiece to provide a right primary signal, and a signal processor configured to receive at least one playback signal, derive an echo reference signal from the at least one playback signal, provide a combined signal from the left and right primary signals, provide a noise reference signal from the left and right primary signals, and filter the combined primary signal to reduce components correlated to the noise reference signal and to reduce components correlated to the echo reference signal, to provide a voice estimate signal.

In some examples, the echo reference signal is derived by processing a plurality of playback signals, each of the plurality of playback signals to be rendered into an acoustic signal by at least one driver associated with the headphone system. In certain examples, processing the plurality of playback signals may include selecting one of the plurality of playback signals based upon at least one of a playback volume, a wind noise component, and a balance parameter.

In certain examples, deriving the echo reference signal from the at least one playback signal includes pre-filtering the at least one playback signal, and pre-filtering the at least one playback signal may include filtering by a set of pre-determined filter coefficients representative of a static echo transfer function.

In various examples, the signal processor may be configured to filter the combined signal by filtering the noise reference signal to generate an estimated noise signal, filtering the echo reference signal to generate an estimated echo signal, and subtracting the estimated noise signal and the estimated echo signal from the combined signal.

According to another aspect, a headphone is provided that includes at least one microphone coupled to an earpiece to provide a microphone signal, at least one input to receive a playback signal from an audio source, at least one acoustic driver coupled to the earpiece and configured to convert the playback signal into an acoustic signal, a noise reduction filter configured to receive a noise reference signal derived from the microphone signal and to provide an estimated noise signal, an echo cancellation filter configured to receive an echo reference signal derived from the playback signal and to provide an estimated echo signal, a signal processor configured to provide an estimated voice signal derived at least in part from the microphone signal, including subtracting the estimated noise signal and the estimated echo signal.

In some examples, the at least one microphone includes a plurality of microphones and the signal processor is configured to provide the estimated voice signal at least in part by array processing one or more signals from the plurality of microphones.

Certain examples include a pre-filter to derive the echo reference signal from the playback signal by pre-filtering the playback signal by a set of pre-determined filter coefficients representative of a static echo transfer function.

In various examples, the at least one input includes a plurality of inputs to receive a plurality of playback signals and the signal processor is further configured to derive the echo reference signal by selecting one of the plurality of playback signals.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like numeral. For purposes of clarity, not every component may be labeled in every figure. In the figures:

FIG. 5C is a schematic diagram of an example echo canceller suitable for one or more example systems described herein.

DETAILED DESCRIPTION

Aspects of the present disclosure are directed to headphone systems and methods that pick-up a voice signal of the user (e.g., wearer) of a headphone while reducing or removing other signal components not associated with the user's voice. Attaining a user's voice signal with reduced noise and echo components may enhance voice-based features or functions available as part of the headphone set or other associated equipment, such as communications systems (cellular, radio, aviation), entertainment systems (gaming), speech recognition applications (speech-to-text, virtual personal assistants), and other systems and applications that process audio, especially speech or voice. Examples disclosed herein may be coupled to, or placed in connection with, other systems, through wired or wireless means, or may be independent of other systems or equipment.

The headphone systems disclosed herein may include, in some examples, aviation headsets, telephone/communication headsets, audio/media headphones, and network gaming headphones, or any combination of these or others. Throughout this disclosure the terms "headset," "headphone," and "headphone set" are used interchangeably, and no distinction is meant to be made by the use of one term over another unless the context clearly indicates otherwise. Additionally, aspects and examples in accord with those disclosed herein, in some circumstances, may be applied to earphone form factors (e.g., in-ear transducers, earbuds), and/or off-ear acoustic devices, e.g., devices worn in the vicinity of the wearer's ears, neck-worn form factors or other form factors on the head or body, e.g., shoulders, or form factors that include one or more drivers (e.g., loudspeakers) directed generally toward a wearer's ear(s) without an adjacent coupling to the wearer's head or ear(s). All such form factors, and similar, are contemplated by the terms "headset," "headphone," and "headphone set." Accordingly, any on-ear, in-ear, over-ear, or off-ear form-factors of personal acoustic devices are intended to be included by the terms "headset," "headphone," and "headphone set." The terms "earpiece" and/or "earcup" may include any portion of such form factors intended to operate in proximity to at least one of a user's ears.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Figure 1:
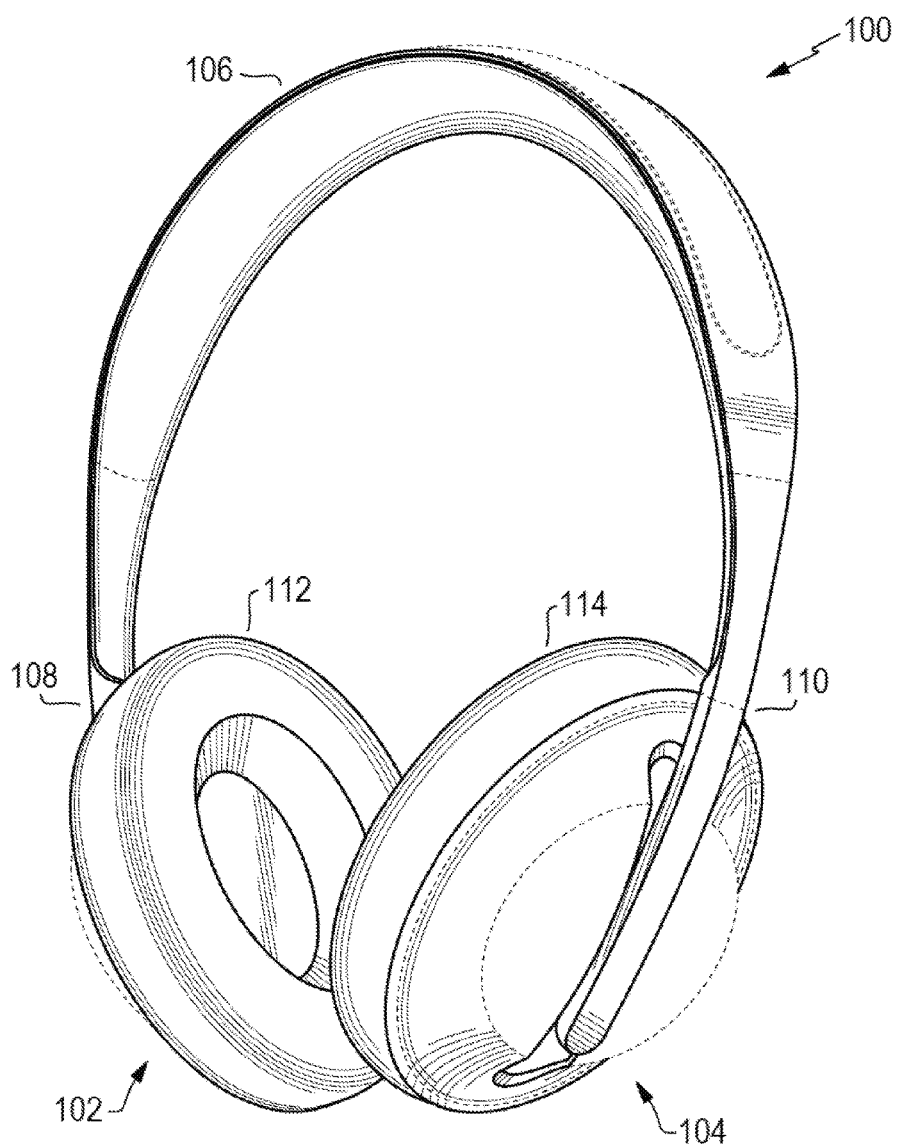
FIG. 1 is a perspective view of an example headphone set.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, right and left, top and bottom, upper and lower, and vertical and horizontal are intended for convenience of description, not to limit the present systems and methods or their components to any one positional or spatial orientation.

FIG. 1 illustrates one example of a headphone set. The headphones 100 include two earpieces, i.e., a right earcup 102 and a left earcup 104, coupled to a right yoke assembly 108 and a left yoke assembly 110, respectively, and intercoupled by a headband 106. The right earcup 102 and left earcup 104 include a right circumaural cushion 112 and a left circumaural cushion 114, respectively. While the example headphones 100 are shown with earpieces having circumaural cushions to fit around or over the ear of a user, in other examples the cushions may sit on the ear, or may include earbud portions that protrude into a portion of a user's ear canal, or may include alternate physical arrangements. As discussed in more detail below, either or both of the earcups 102, 104 may include one or more microphones. Although the example headphones 100 illustrated in FIG. 1 include two earpieces, some examples may include only a single earpiece for use on one side of the head only. Additionally, although the example headphones 100 illustrated in FIG. 1 include a headband 106, other examples may include different support structures to maintain one or more earpieces (e.g., earcups, in-ear structures, etc.) in proximity to a user's ear, e.g., an earbud may include a shape and/or materials configured to hold the earbud within a portion of a user's ear.

Figure 2:
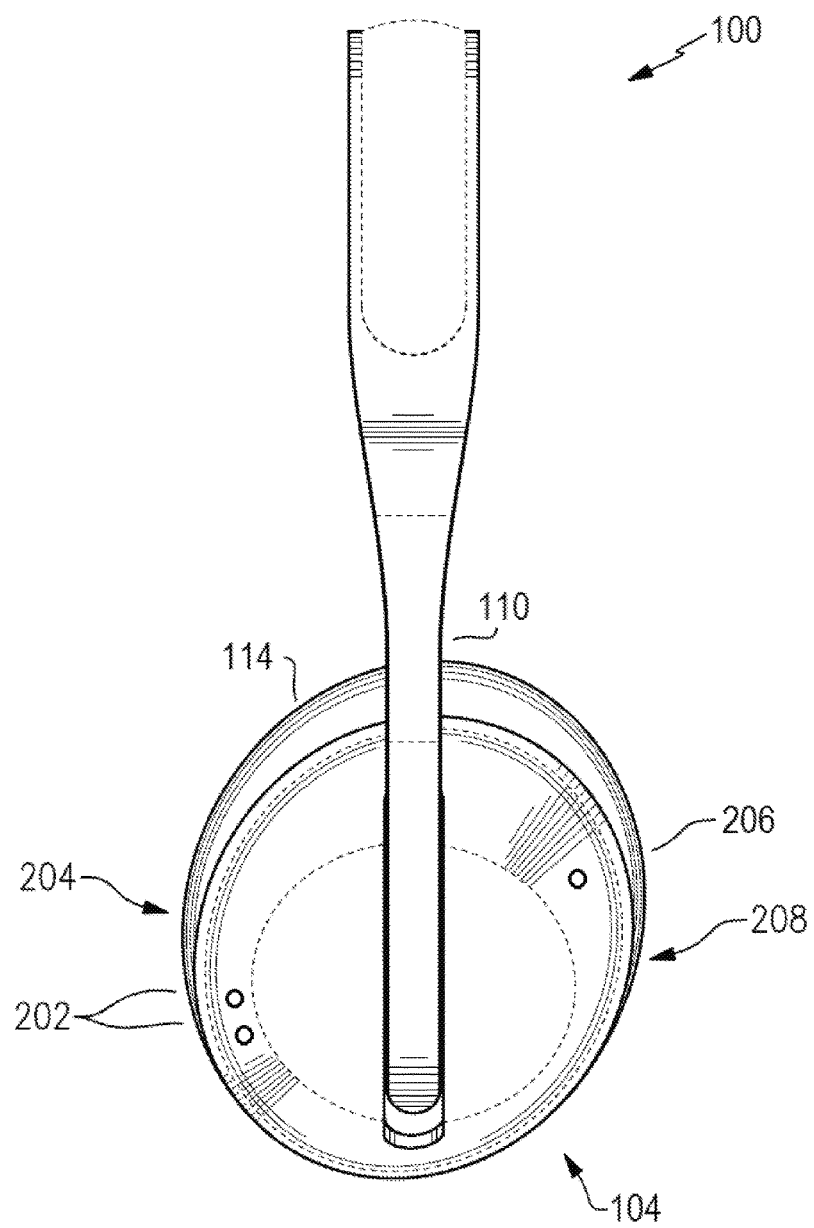
FIG. 2 is a left-side view of an example headphone set.

FIG. 2 illustrates headphones 100 from the left side and shows details of the left earcup 104 including a pair of front microphones 202, which may be nearer a front edge 204 of the earcup, and a rear microphone 206, which may be nearer a rear edge 208 of the earcup. The right earcup 102 may additionally or alternatively have a similar arrangement of front and rear microphones, though in examples the two earcups may have a differing arrangement in number or placement of microphones. Additionally, various examples may have more or fewer front microphones 202 and may have more, fewer, or no rear microphones 206. While microphones are illustrated in the various figures and labeled with reference numerals, such as reference numerals 202, 206 the visual element illustrated in the figures may, in some examples, represent an acoustic port wherein acoustic signals enter to ultimately reach a microphone 202, 206 which may be internal and not physically visible from the exterior. In examples, one or more of the microphones 202, 206 may be immediately adjacent to the interior of an acoustic port, or may be removed from an acoustic port by a distance, and may include an acoustic waveguide between an acoustic port and an associated microphone.

Signals from the microphones may be combined with array processing to advantageously steer beams and nulls in a manner that maximizes the user's voice in one instance to provide a primary signal, and minimizes the user's voice in another instance to provide a reference signal. The reference signal is correlated to the surrounding environmental noise and is provided as a reference to an adaptive filter. The adaptive filter modifies the primary signal to remove components that correlate to the reference signal, e.g., the noise correlated signal, and the adaptive filter provides an output signal that approximates the user's voice signal.

Headphone and headset systems in accord with systems and methods discussed herein may include loudspeakers, e.g., acoustic drivers, that receive one or more playback audio signals and produce one or more acoustic signals audible to the user. Examples of playback audio signals include communication signals, e.g., from a far-end communication partner, such as when using the headphone for telephone calls, aviation and/or radio communications, etc., and program content such as music, gaming, or other entertainment content. In some instances, one or more of the microphones may pick up a portion of the acoustic signals produced by the driver by, for example, direct transmission of vibrations through the structure of the headphone or by acoustic transmission due to proximity of the driver to the microphone. Accordingly, one or more microphone signals may include components related to portions of the playback audio signal, and such components may be referred to generally as echo components. Headphone systems and methods in accord with those discussed herein work to reduce or remove noise and echo components from one or more microphone signals, an advantage of which is to enhance the user's voice components within at least one output signal.

Additional processing may occur as discussed in more detail below, and microphone signals from both right and left sides (i.e., binaural), may be combined, also as discussed in more detail below. Further, signals may be advantageously processed in different sub-bands to enhance the effectiveness of noise and echo reduction.

Production of a signal wherein a user's voice components are enhanced while other components are reduced is referred to generally herein as voice pick-up, voice selection, voice isolation, speech enhancement, and the like. As used herein, the terms "voice," "speech," "talk," and variations thereof are used interchangeably and without regard for whether such speech involves use of the vocal folds.

Methods of selecting or enhancing a user's voice component may take advantage of unique aspects of the environment and/or conditions of use. For example, in a headphone having microphone(s) on a left and right side, the desirable user's voice may be symmetrical, arriving at both a right front microphone and a left front microphone with substantially the same amplitude and phase. Undesirable echo and/or noise content may have characteristics that assist in distinguishing them from the user's voice. For example, echo content will be related to a playback audio signal, which is available to the system as a reference. Background noise, including speech from other people, will tend to be asymmetrical between the right and left, having variation in amplitude, phase, and time, or may be stronger in a rear microphone, for example, thus providing a reference from which certain filter techniques may remove components from a primary signal path.

Figure 3:
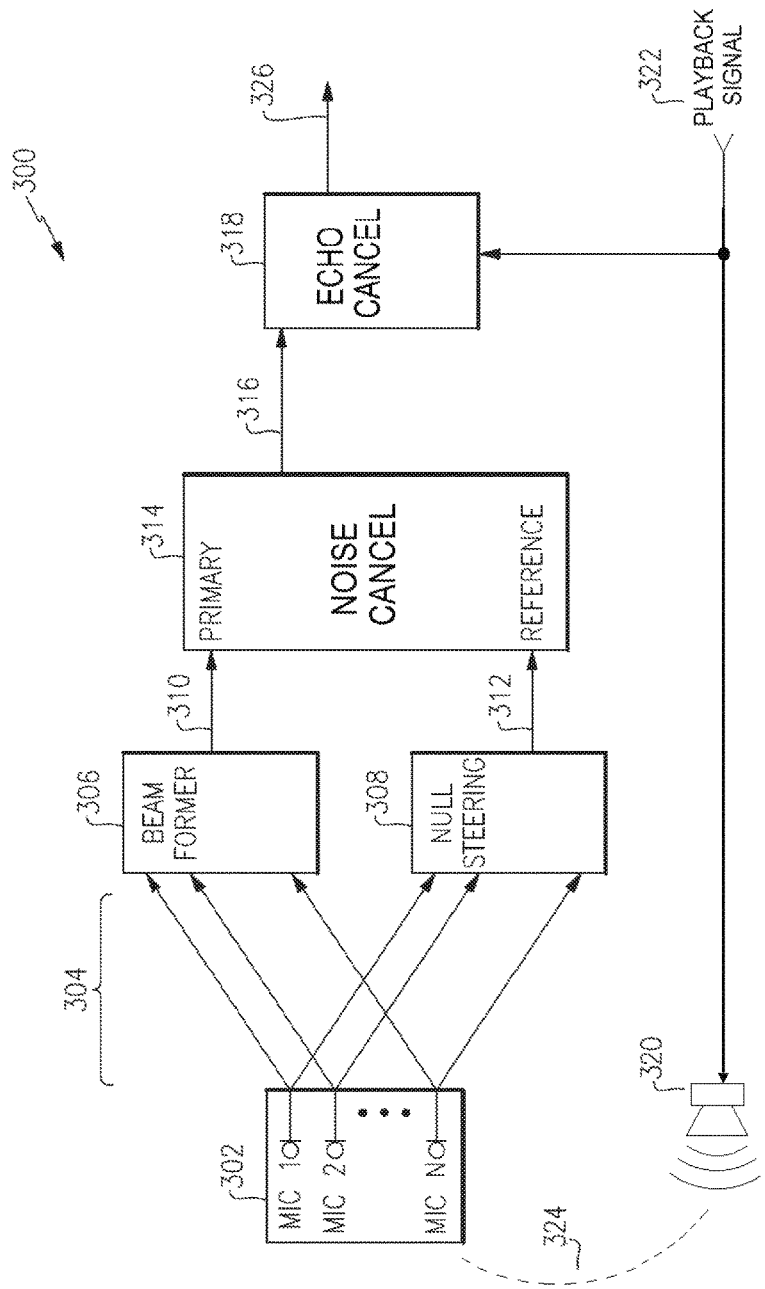
FIG. 3 is a schematic diagram of an example system to enhance a user's voice signal among other signals.

FIG. 3 is a block diagram of an example signal processing system 300 that processes microphone signals to produce an output signal that includes a user's voice component enhanced with respect to echo, background noise, and other talkers. A set of multiple microphones 302 convert acoustic energy into electronic signals 304 and provide the signals 304 to each of two array processors 306, 308. The signals 304 may be in analog form. Alternately, one or more analog-to-digital converters (ADC) (not shown) may first convert the microphone outputs so that the signals 304 may be in digital form.

The array processors 306, 308 apply array processing techniques, such as phased array, delay-and-sum techniques, and may utilize minimum variance distortionless response (MVDR) and linear constraint minimum variance (LCMV) techniques, to adapt a responsiveness of the set of microphones 302 to enhance or reject acoustic signals from various directions. Beam forming enhances acoustic signals from a particular direction, or range of directions, while null steering reduces or rejects acoustic signals from a particular direction or range of directions.

The first array processor 306 is a beam former that works to maximize acoustic response of the set of microphones 302 in the direction of the user's mouth (e.g., directed to the front of and slightly below an earcup), and provides a primary signal 310. Because of the beam forming array processor 306, the primary signal 310 includes a higher signal energy due to the user's voice than any of the individual microphone signals 304.

Any of the microphone signals 304 may include echo components from an acoustic driver 320 reproducing a playback audio signal 322 (e.g., communication signals from a far-end communication partner, program content such as music, gaming, or other entertainment content, etc.), through acoustic and/or vibrational coupling 324. Accordingly, the primary signal 310 may include the user's voice, noise, and echo components.

The second array processor 308 steers a null toward the user's mouth and provides a reference signal 312. The reference signal 312 includes minimal, if any, signal energy due to the user's voice because of the null directed at the user's mouth. Accordingly, the reference signal 312 is composed substantially of components due to background noise and acoustic sources not due to the user's voice, e.g., the reference signal 312 is a signal correlated to the acoustic environment around the user but not including the user's voice.

In certain examples, the array processor 306 is a super-directive near-field beam former that enhances acoustic response in the direction of the user's mouth, and the array processor 308 is a delay-and-sum algorithm that reduces acoustic response in the direction of the user's mouth.

As discussed above, the primary signal 310 may include a user's voice component, a noise component (e.g., background, other talkers, etc.), and an echo component. The reference signal 312 may also include voice, noise, and echo components, but primarily acts as a noise reference. In particular, the reference signal 312 has enhanced noise components and reduced voice component due to action of the array processor 308. Accordingly, the reference signal 312 may be substantially correlated to the noise component of the primary signal 310, and thus noise cancellation systems, such as adaptive filtration, may remove at least some of the noise component from the primary signal 310. Similarly, echo components are related to the playback audio signal 322, and echo cancellation systems, which may also include adaptive filtration, may remove at least some of the echo component, e.g., using the playback audio signal 322 as an echo reference.

The primary signal 310 is processed by a noise canceller 314, using the reference signal 312 as a noise reference, to provide a first voice estimate signal 316. The first voice estimate signal 316 is processed by an echo canceller 318, using the playback audio signal 322 as an echo reference, to provide a second voice estimate signal 326. In some examples, the echo canceller 318 and the noise canceller 314 may operate in a different order or in parallel, e.g., echo components may first be reduced from the primary signal 310 by the echo canceller 318, followed by noise reduction of the noise canceller 314, for example.

The noise canceller 314 seeks to remove components correlated to a noise reference, e.g., the reference signal 312. Various filters, which may be adaptive, are designed to estimate the noise components by filtering the reference signal. Such filters may be adaptive by action of an adaptive algorithm, certain examples of which may include a normalized least mean square (NLMS) adaptive filter, or a recursive least squares (RLS) adaptive filter. Additionally and similarly, the echo canceller 318 seeks to remove components correlated to an echo reference, e.g., the playback audio signal 322, and may use similar methods, filters, and adaptive algorithms.

For example, the noise canceller 314 and echo canceller 318 may each include one or more filters to receive a reference signal and attempt to generate from the reference signal an estimate of the unwanted component in a primary signal. The unwanted component of the primary signal may be, e.g., a noise or echo component. A noise canceller's filter(s) produces an estimate of the noise component, i.e., a noise estimate. Similarly, an echo canceller's filter(s) produces an estimate of the echo component, i.e., an estimated echo. If the filters successfully generate robust estimate signals, the noise component may be effectively reduced or removed by subtracting the noise estimate and the echo component may be effectively reduced or removed by subtracting the estimated echo. An adaptive algorithm may operate in parallel to such example filters, especially implemented as a digital filter, and make adjustments to the digital filter in the form of, e.g., changing weights or filter coefficients.

In certain examples, a reference signal, such as the reference signal 312, may be derived by other methods or by other components than those discussed above. For example, the reference signal may be derived from one or more separate microphones with reduced responsiveness to the user's voice, such as a rear-facing microphone, e.g., the rear microphone 206. Alternately the reference signal may be derived from the set of microphones 302 using beam forming techniques to direct a broad beam away from the user's mouth, or may be combined without array or beam forming techniques to be responsive to the acoustic environment more generally.

As discussed above, in some examples an echo canceller may operate on a signal before a noise canceller. For instance, in FIG. 3 the echo canceller 318 and the noise canceller 314 may exchange positions in certain alternate examples of the signal processing system 300. For example, the echo canceller 318 may be configured to receive the primary signal 310 and to remove or reduce echo content (related to the playback audio signal 322), and the noise canceller 314 may be configured to receive the output signal from the echo canceller 318 and to remove or reduce noise content related to the reference signal 312.

The example system 300 may be advantageously applied to a headphone system, e.g., the headphones 100, to enhance the user's voice and reduce background noise. For example, and as discussed in greater detail below, signals from the microphones 202 (FIG. 2) may be processed by the example system 300 to provide a first voice estimate signal 316 having a voice component enhanced with respect to background noise, the voice component representing speech from the user, i.e., the wearer of the headphones 100. The example system 300 illustrates a system and method for "monaural" speech enhancement from one array of microphones 302. In some examples, the example system 300 may be "binaural" in the sense that, e.g., the array of microphones 302 may include microphones on each of a left and right side. In some examples, variations to the system 300 include, at least, binaural processing of two arrays of microphones (e.g., right and left arrays), further speech enhancement by spectral processing, and separate processing of signals by sub-bands.

As discussed above, the example system 300 may operate in a digital domain and may include analog-to-digital converters (not shown). Additionally, components and processes included in the example system 300 may achieve better performance when operating upon narrow-band signals instead of wideband signals. Accordingly, certain examples may include sub-band filtering to allow processing of one or more sub-bands by the example system 300. For example, beam forming, null steering, adaptive filtering, and spectral enhancement may exhibit enhanced functionality when operating upon individual sub-bands. The sub-bands may be synthesized together after operation of the example system 300 to produce a single output signal. In certain examples, the signals 304 may be filtered to remove content outside the typical spectrum of human speech. Alternately or additionally, the example system 300 may be employed to operate on sub-bands. Such sub-bands may be within a spectrum associated with human speech. Additionally or alternately, the example system 300 may be configured to ignore sub-bands outside the spectrum associated with human speech. Additionally, while the example system 300 is discussed above with reference to only a single set of microphones 302, in certain examples there may be additional sets of microphones, for example a set on the left side and another set on the right side, to which further aspects and examples of the example system 300 may be applied, and combined, to provide improved voice enhancement, at least one example of which is discussed in more detail with reference to FIG. 4A.

Figure 4A:
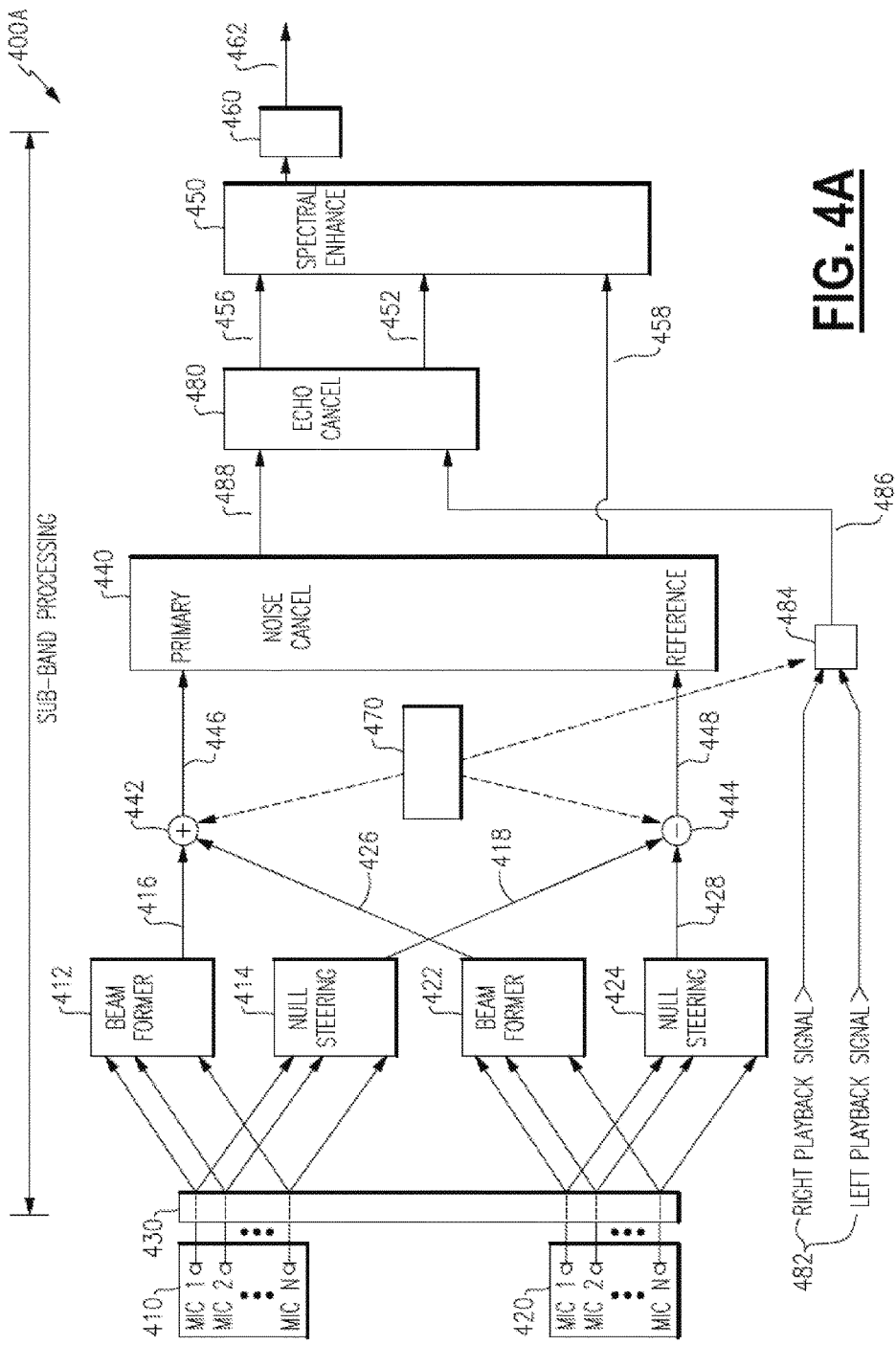
FIGS. 4A-4B are schematic diagrams of other example systems to enhance a user's voice signal among other signals.

FIG. 4A is a block diagram of an example signal processing system 400A including a right microphone array 410, a left microphone array 420, a sub-band filter 430, a right beam processor 412, a right null processor 414, a left beam processor 422, a left null processor 424, inputs for right and left playback signals 482, combiners 442, 444, a noise canceller 440, a pre-filter 484, an echo canceller 480, a spectral enhancer 450, a sub-band synthesizer 460, and a weighting calculator 470. The right microphone array 410 includes multiple microphones on the user's right side, e.g., coupled to a right earcup 102 on a set of headphones 100 (see FIGS. 1-2), responsive to acoustic signals on the user's right side, including potential coupling from an audio playback signal on the right side. The left microphone array 420 includes multiple microphones on the user's left side, e.g., coupled to a left earcup 104 on a set of headphones 100 (see FIGS. 1-2), responsive to acoustic signals on the user's left side, including potential coupling from an audio playback signal on the left side. Each of the right and left microphone arrays 410, 420 may include a single pair of microphones, comparable to the pair of microphones 202 shown in FIG. 2. In other examples, more than two microphones may be provided and used on each earpiece.

In the example shown in FIG. 4A, each microphone to be used for speech enhancement in accordance with aspects and examples disclosed herein provides a signal to an optional sub-band filter 430, which separates spectral components of each microphone into multiple sub-bands. Signals from each microphone may be processed in analog form but preferably are converted to digital form by one or more ADC's associated with each microphone, or associated with the sub-band filter 430, or otherwise acting on each microphone's output signal between the microphone and the sub-band filter 430, or elsewhere. Accordingly, in certain examples the sub-band filter 430 is a digital filter acting upon digital signals derived from each of the microphones. Any of the ADC's, the sub-band filter 430, and other components of the example system 400A may be implemented in a digital signal processor (DSP) by configuring and/or programming the DSP to perform the functions of, or act as, any of the components shown or discussed.

The right beam processor 412 is a beam former that acts upon signals from the right microphone array 410 in a manner to form an acoustically responsive beam directed toward the user's mouth, e.g., below and in front of the user's right ear, to provide a right primary signal 416, so-called because it includes an increased user voice component due to the beam directed at the user's mouth. The right null processor 414 acts upon signals from the right microphone array 410 in a manner to form an acoustically unresponsive null directed toward the user's mouth to provide a right reference signal 418, so-called because it includes a reduced user voice component due to the null directed at the user's mouth. Similarly, the left beam processor 422 provides a left primary signal 426 from the left microphone array 420, and the left null processor 424 provides a left reference signal 428 from the left microphone array 420. The right primary and reference signals 416, 418 are comparable to the primary and reference signals discussed above with respect to the example system 300 of FIG. 3. Likewise, the left primary and reference signals 426, 428 are comparable to the primary and reference signals discussed above with respect to the example system 300 of FIG. 3.

The example system 400A processes the binaural set, right and left, of primary and reference signals, which may improve performance over the monaural example system 300. As discussed in greater detail below, the weighting calculator 470 may influence the left-right balance (or panning) of the system by influencing (a) how much (and which particular frequencies or frequency bands) of each of the right and left primary signals 416, 426 are provided to the noise canceller 440, and subsequently to the echo canceller 480, (b) how much (and which particular frequencies or frequency bands) of each of the right and left reference signals 418, 428 are provided to the noise canceller 440, (c) how much (and which particular frequencies or frequency bands) of each of the right and left playback signals 482 are provided to the echo canceller 480, and (d) whether each of the right and left primary signals 416, 426 are provided at all. The weighting calculator 470 may influence the left-right balance of the system even to the extent of providing only one of the left or right set of signals, in which case the operation of system 400A is reduced to a monaural case, similar to the example system 300.

The combiner 442 combines the binaural primary signals, i.e., the right primary signal 416 and the left primary signal 426, for example by adding them together, to provide a combined primary signal 446 to the noise canceller 440. The right and left microphone arrays 410, 420 are approximately symmetric and equidistant relative to the user's mouth. Due to this physical symmetry, acoustic signals from the user's mouth arrive at each of the right and left microphone arrays 410, 420 with substantially equal energy at substantially the same time and with substantially the same phase. Accordingly, the user's voice component within the right and left primary signals 416, 426 may be substantially symmetric to each other and reinforce each other in the combined primary signal 446. Various other acoustic signals, e.g., background noise and other talkers, tend not to be right-left symmetric about the user's head and do not reinforce each other in the combined primary signal 446. While such noise components within the right and left primary signals 416, 426 carry through to the combined primary signal 446, they do not reinforce each other in the manner that the user's voice components may. Accordingly, the user's voice components may be more substantial in the combined primary signal 446 than in either of the right or left primary signals 416, 426 individually. Additionally, weighting applied by the weighting calculator 470 may influence whether noise and voice components within each of the right and left primary signals 416, 426 are more or less represented in the combined primary signal 446.

The combiner 444 combines the right reference signal 418 and the left reference signal 428 to provide a combined reference signal 448 to the noise canceller 440. In examples, the combiner 444 may take a difference between the right reference signal 418 and the left reference signal 428, e.g., by subtracting one from the other, to provide the combined reference signal 448. Due to the null steering action of the right and left null processors 414, 424, there is minimal, if any, user voice component in each of the right and left reference signals 418, 428. Any such user voice component in each of the right and left reference signals 418, 428 tend to cancel each other out when subtracted, at least because the user voice components are symmetrical in a similar manner to that discussed above. Accordingly there is minimal, if any, user voice component in the combined reference signal 448. As above, weighting applied by the weighting calculator 470 may influence whether the right or left reference signals are more or less represented in the combined reference signal 448.

The noise canceller 440 is comparable to the noise canceller 314 of FIG. 3. The noise canceller 440 receives the combined primary signal 446 and the combined reference signal 448 and applies a digital filter, potentially with adaptive coefficients, to provide a first voice estimate signal 488 and a noise estimate signal 458. In some examples, adaptive coefficients may be established while the user is not speaking (e.g., during an enforced pause after an initial user action, such as a wake-up word or button press), and may be frozen when the user (near-end) is speaking, when the far-end user is speaking, or when both the near-end and far-end are speaking (as may be indicated by a, e.g., double talk detector), or may be updated at intervals by a background or parallel process, or may be established or updated by any combination of these or other approaches. Further aspects of at least one example of a double talk detector may be had with reference to U.S. patent application Ser. No. 15/609,297 entitled VOICE ACTIVITY DETECTION FOR COMMUNICATION HEADSET, filed on May 31, 2017, and U.S. patent application Ser. No. 15/463,259 entitled SYSTEMS AND METHODS OF DETECTING SPEECH ACTIVITY OF HEADPHONE USER, filed on Mar. 20, 2017

Also as discussed above, the combined reference signal 448 may be substantially correlated to the noise component(s) in the combined primary signal 446. The operation of the noise canceller 440 may be to adapt or "learn" the best digital filter coefficients to convert the combined reference signal 448 into a noise estimate signal (e.g., the noise estimate signal 458) that is substantially similar to the noise component(s) in the combined primary signal 446. The noise canceller 440 then subtracts the noise estimate signal 458 from the combined primary signal 446 to provide the first voice estimate signal 488. The first voice estimate signal 488 may still include significant echo components, and is further processed by the echo canceller 480.

The pre-filter 484 combines the right and left playback signals 482 to provide an echo reference signal 486 to the echo canceller 480, and may apply filtering to the right and/or left playback signals 482. The right and left playback signals 482 may couple to the right and left microphone arrays 410, 420, respectively, through acoustic and mechanical coupling between a right and left driver (not shown), and the respective right and left microphone arrays 410, 420, which may produce echo components in any of the individual microphone signals. These echo components may carry through to, at least, the right and left primary signals 416, 426. The echo canceller 480 seeks to remove the echo components. Because the echo components are related (e.g., correlated) to the right and left playback signals 482, the echo reference signal 486 is a combined echo reference signal. As above, weighting applied by the weighting calculator 470 may influence whether the right playback signal or left playback signal is more or less represented in the echo reference signal 486.

The echo canceller 480 receives the first voice estimate signal 488 and the echo reference signal 486 and seeks to reduce or remove echo component(s) from the first voice estimate signal 488, to provide a second voice estimate signal 456. The echo canceller 480 may apply a filter, e.g., a digital filter, potentially with adaptive coefficients, to the echo reference signal 486 to generate an estimated echo signal 452, which in some examples may be subtracted from the first voice estimate signal 488 to provide the second voice estimate signal 456. In some examples, adaptive coefficients used by the echo canceller 480 may be established or updated at intervals, e.g., in one or more manners similar to those discussed above with regard to the noise canceller 440. In some examples, the echo canceller 480 may adapt only when a playback signal, e.g., an echo reference signal, is present and/or being actively provided to a loudspeaker to reproduce an acoustic signal. At other times, no echo may be present because no playback signal is being reproduced. Accordingly, filter adaptation of an echo canceller, e.g., the echo canceller 480, may be frozen when no playback signal is present, and/or an echo canceller may be turned off, disabled, or immobilized while no playback signal is present, which may save energy, for example.

As discussed above, the echo reference signal 486 is used as an echo reference signal by the echo canceller 480, and is provided by the pre-filter 484. In various examples, the pre-filter 484 may adjust the balance, e.g., pan between the left and right playback signals 482, to provide the echo reference signal 486. The pre-filter 484 may pan left or right in response to various conditions, which may be indicated by the weighting calculator 470, and which may include noise balance (such as wind may cause higher noise on one side than the other), playback volume (echo path coupling may not be the same on the left and the right, and/or playback audio may have varying amplitude on the left versus the right), detection that the user is wearing, e.g., holding up to his or her ear, only one side of the headphone, or any other asymmetrical condition that may indicate an adjustment to left-right balance may provide enhanced echo cancellation.

In some examples, the pre-filter 484 may filter either of the right or left playback signals 482, or a combination of the two, such that the echo reference signal 486 is a first estimated echo signal. For example, filter coefficients for the pre-filter 484 may be pre-selected or pre-configured, based upon acoustic testing, for instance, so the echo reference signal 486 provides a robust estimated echo. Accordingly in such examples the echo canceller 480 may only need to accommodate less significant variations in the echo path, e.g., variation that represents a departure from a previously determined echo coupling. In some examples, the pre-filter 484 may be incorporated into the echo canceller 480, and may compensate for a pre-established or expected transfer path. For example, echo cancellation accomplished by the system 400A may be provided by a combination of a static filter (e.g., the pre-filter 484) and an adaptive filter (e.g., as part of the echo canceller 480), such that the adaptive filter need only adapt to variations from a pre-determined static transfer function. In some examples, the echo canceller 480 may incorporate a static filter, which may be an equivalent to the pre-filter 484 in some cases. In certain examples, a "static" filter may be provided by a set of adaptive filter coefficients previously stored, e.g., in a memory, and initially loaded into the adaptive filter of the echo canceller 480, which may subsequently adapt the coefficients from the initially loaded values.

In some examples, the system 400A may be configured to disable and/or bypass the echo canceller 480 when a playback volume is low, during which echo coupling between an acoustic driver and any of the microphones may be negligible. In some examples, such disabling may be achieved by the pre-filter 484 or a separate controller determining the playback volume and providing a null value as the echo reference signal 486.

In some examples, the system 400A may switch to a monaural operation of either or both of the noise canceller 440 and the echo canceller 480, e.g., during a condition of extreme playback volume and/or extreme noise (e.g., wind) on either of the left or right sides. In some examples, such monaural operation of the echo canceller 480 may be achieved by the pre-filter 484 accepting only one of the right or left playback signals 482 as input to provide the echo reference signal 486. Similarly, in some examples, monaural operation of the noise canceller 440 may be achieved by the combiners 442, 444 accepting only one of the right or left primary signals 416, 426 and reference signals 418, 428, respectively, to provide the combined primary signal 446 and the combined reference signal 448, also respectively.

In some examples, the system 400A may implement alternative changes to operation in response to various conditions. For example, in response to high wind, high noise, and/or high playback volume, on one side or on both sides, the system 400A may change operation of one or more of the array processors 412, 414, 422, 424 to compensate or reduce the noise and/or echo content in the respective primary or reference signals 416, 418, 426, 428, or to adjust which of the microphones in either or both of the microphone arrays 410, 420 are used to provide the respective primary or reference signals 416, 418, 426, 428. Additionally or alternately, some examples may switch to different sets of microphones or otherwise switch or change either or both of the microphone arrays 410, 420. In some examples, the overall spectral content or operation of the system 400A may be changed. Wind may have a higher weighting of lower frequency components, for example, and/or equipment noise may have particularly high noise at certain frequency components, and the system 400A may make various adjustments, such as those described above and/or others, within individual sub-bands, e.g., to disable processing or content in certain sub-bands, and/or to use a different left-right balance, array processing, and/or microphone signals, in certain sub-bands than in other sub-bands. Additionally or alternately, processing based upon spectral content may be implemented as spectral filtering or band-limiting at, for example, the sub-band filter 430 or elsewhere.

In some examples, the second voice estimate signal 456 may be provided to a spectral enhancer 450 along with one or more of the noise estimate signal 458 and the estimated echo signal 452, to reduce the effects of any residual noise and/or residual echo remaining after operation of the noise canceller 440 and the echo canceller 480, respectively.

Specifically, the noise canceller 440 may generate a more robust first voice estimate signal 488 when there are fewer and/or stationary noise sources. Accordingly, numerous and/or non-stationary noise sources, or other effects, may cause the first voice estimate signal 488 (and the second voice estimate signal 456) to include greater than desired residual noise content. Similarly, the echo canceller 480 may perform better at removing echo components when echo coupling is caused by purely linear mechanisms and when the playback audio is consistent (e.g., in spectral content, amplitude, etc.). Accordingly, non-linear echo coupling and/or varying playback content, or other effects, may cause the second voice estimate signal 456 to include greater than desired residual echo.

Accordingly, in some examples, the spectral enhancer 450 is employed to reduce the effects of residual noise and residual echo, e.g., by enhancing the short-time spectral amplitude (STSA) of the second voice estimate signal 456 to provide the voice output signal 462. Examples of spectral enhancement that may be implemented in the spectral enhancer 450 include spectral subtraction techniques, minimum mean square error techniques, and Wiener filter techniques. Spectral enhancement via the spectral enhancer 450 may further improve the voice-to-noise and/or voice-to-echo ratios of the voice output signal 462. In some examples, the spectral enhancer 450 utilizes spectral information about noise and echo content, and as shown in FIG. 4A the spectral enhancer uses the noise estimate signal 458 and the estimated echo signal 452 for respective spectral information. In other examples, the spectral enhancer 450 may use either of the combined primary reference signal 448 or the noise estimate signal 458, or a combination of the two, or other noise references, for spectral information about the noise content. Additionally, the spectral enhancer 450 may use either of the estimated echo signal 452 or the echo reference signal 486, or a combination of the two, or other playback/echo references, for spectral information about the echo content. In some examples, the spectral enhancer 450 may operate to provide enhancement only with respective to one or the other of the noise or the echo. In other examples, a spectral enhancer may be omitted or may operate in other manners.

As discussed above, in the example system 400A, the signals from the microphones are separated into sub-bands by the sub-band filter 430. Each of the subsequent components of the example system 400A illustrated in FIG. 4A logically represents multiple such components to process the multiple sub-bands. For example, the sub-band filter 430 may process the microphone signals to provide frequencies limited to a particular range, and within that range may provide multiple sub-bands that in combination encompass the full range. In one particular example, the sub-band filter may provide sixty-four sub-bands covering 125 Hz each across a frequency range of 0 to 8,000 Hz. An analog to digital sampling rate may be selected for the highest frequency of interest, for example a 16 kHz sampling rate satisfies the Nyquist-Shannon sampling theorem for a frequency range up to 8 kHz.

Accordingly, to illustrate that each component of the example system 400A illustrated in FIG. 4A represents multiple such components, it is considered that in a particular example the sub-band filter 430 may provide sixty-four sub-bands covering 125 Hz each, and that two of these sub-bands may include a first sub-band, e.g., for the frequencies 1,400 A Hz-1,625 Hz, and a second sub-band, e.g., for the frequencies 1,625 Hz-1,750 Hz. A first right beam processor 412 will act on the first sub-band, and a second right beam processor 412 will act on the second sub-band. A first right null processer 414 will act on the first sub-band, and a second right null processor 414 will act on the second sub-band. The same may be said of all the components illustrated in FIG. 4A from the output of the sub-band filter 430 through to the input of the sub-band synthesizer 460, which acts to re-combine all the sub-bands into a single voice output signal 462. Accordingly, in at least one example, there are sixty-four each of the right beam processor 412, right null processor 414, left beam processor 422, left null processor 424, noise canceller 440, combiner 442, combiner 444, echo canceller 480, pre-filter 484, and spectral enhancer 450. Other examples may include more or fewer sub-bands, or may not operate upon sub-bands, for example by not including the sub-band filter 430 and the sub-band synthesizer 460. Any sampling frequency, frequency range, and number of sub-bands may be implemented to accommodate varying system requirements, operational parameters, and applications. Additionally, multiples of each component may nonetheless be implemented in, or performed by, a single digital signal processor or other circuitry, or a combination of one or more digital signal processors and/or other circuitry.

The weighting calculator 470 may advantageously improve performance of the example system 400A, or may be omitted altogether in various examples. The weighting calculator 470 may control which particular frequencies or frequency bands and balance/panning, e.g., how much of the left or right signals, are factored into the combined primary signal 446, the combined reference signal 448, and/or the echo reference signal 486. The weighting calculator 470 establishes factors applied by the combiners 442, 444 and the pre-filter 484. The weighting calculator 470 may monitor and analyze any of the microphone signals, such as one or more of the right microphones 410 and the left microphones 420, or may monitor and analyze any of the primary or reference signals, such as the right and left primary signals 416, 426, the right and left reference signals 418, 428, and/or the right and left playback signals 482, to determine an appropriate weighting for any of the combiners 442, 444 and/or pre-filter 484.

In certain examples, the weighting calculator 470 analyzes the total signal amplitude, or energy, of any of the right and left signals and may more heavily weight whichever side has the lower total amplitude or energy. For example, if one side has substantially higher amplitude, such may indicate higher noise or playback levels affecting that side's microphone array. Accordingly, reducing the weight of that side's primary signal into the combined primary signal 446 may effectively reduce noise and echo, e.g., increase the voice-to-noise ratio and/or voice-to-echo ratio, in the combined primary signal 446, and may improve the performance of the system. In similar fashion, the weighting calculator 470 may apply or indicate a similar weighting to the combiner 444 and/or the pre-filter 484.

In some examples, the pre-filter 484 may pan completely left or right, e.g., reject entirely either of the right or left playback signals 482, to provide the echo reference signal 486. In some examples, the pre-filter 484 may be configured to receive only one of the right or left playback signals 482 and the "combined" playback signal 486 may therefore be just the single (left or right) playback signal 482, or may be a filtered version thereof, without any combining with the other (left or right) playback signal. For example, in certain applications the right and left playback signals 482 may be identical (e.g., not stereo) and only a single one of the playback signals may be necessary as an echo reference. In some examples, the right and left playback signals 482 may not be identical but may be highly correlated, e.g., having a substantial amount of content in common, and the pre-filter 484 may accept, pass, or otherwise operate on the common content, to provide the echo reference signal 486. In other examples, the system may accommodate only a single playback signal, for instance.

The voice output signal 462 may be provided to various other components, devices, features, or functions. For example, in at least one example the voice output signal 462 is provided to a virtual personal assistant for further processing, including voice recognition and/or speech-to-text processing, which may further be provided for internet searching, calendar management, personal communications, etc. The voice output signal 462 may be provided for direct communications purposes, such as a telephone call or radio transmission. In certain examples, the voice output signal 462 may be provided in digital form. In other examples, the voice output signal 462 may be provided in analog form. In certain examples, the voice output signal 462 may be provided wirelessly to another device, such as a smartphone or tablet. Wireless connections may be by Bluetooth® or near field communications (NFC) standards or other wireless protocols sufficient to transfer voice data in various forms. In certain examples, the voice output signal 462 may be conveyed by wired connections. Aspects and examples disclosed herein may be advantageously applied to provide a speech enhanced voice output signal from a user wearing a headset, headphones, earphones, etc. in an environment that may be susceptible to echo and may have additional acoustic sources such as other talkers, machinery and equipment, aviation and aircraft noise, or any other background noise sources.

Figure 4B:
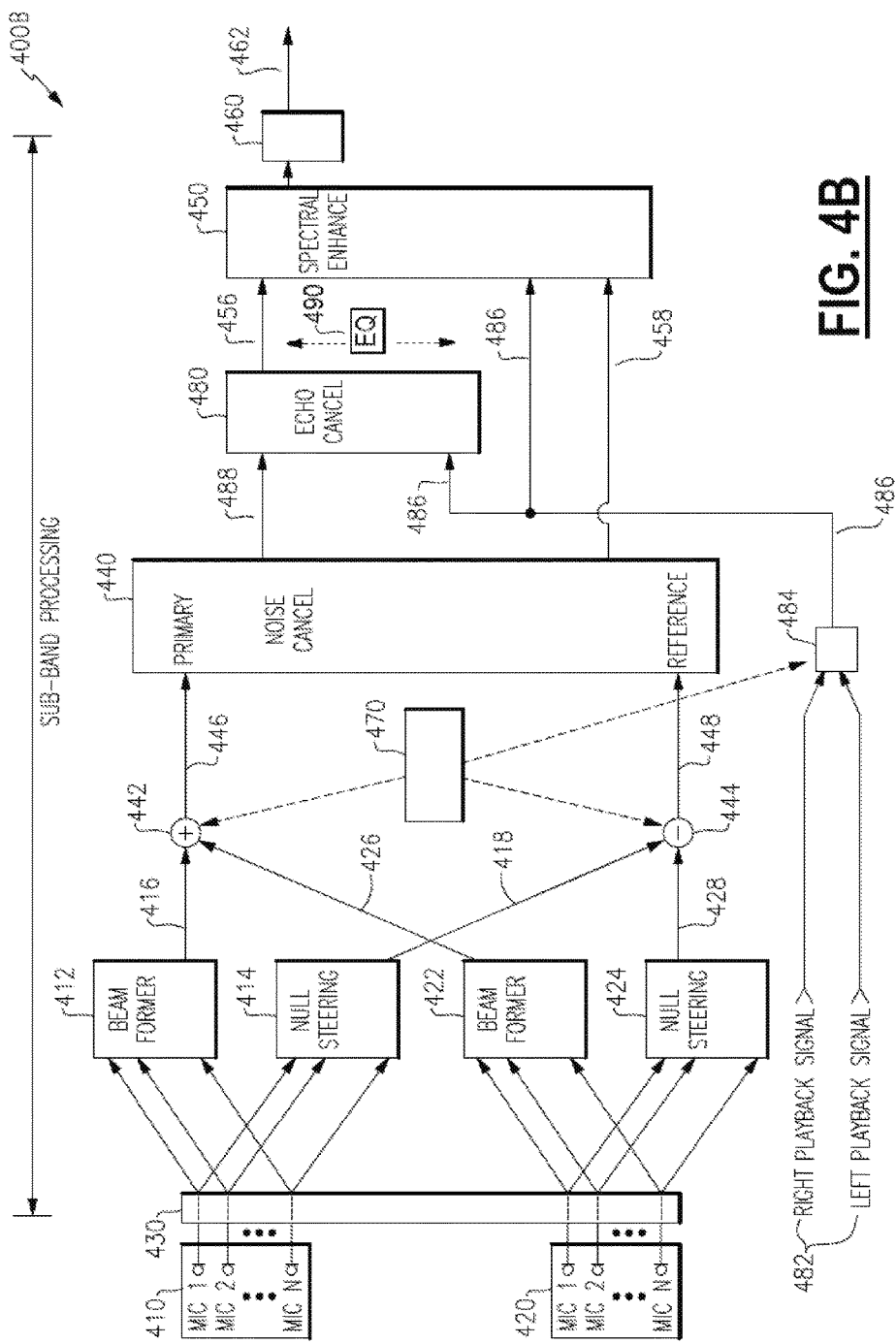

FIG. 4B illustrates another example system 400B, which is similar to the system 400A except that the echo reference signal 486 is provided to the spectral enhancer 450, rather than the estimated echo signal 452. In various examples, an equalization block 490 may be included, such as when a reference signal rather than an estimated signal is provided to the spectral enhancer 450. The equalization block 490 is configured to equalize the second voice estimate signal 456 with the echo reference signal 486. As discussed above, the second voice estimate signal 456 may be provided by the echo canceller 480 from the first voice estimate signal 488, which may be influenced by various array processing techniques, while the echo reference signal 486 may come from the pre-filter 484, such that the second voice estimate signal 456 and the echo reference signal 486 may have substantially differing frequency responses and/or differing gains applied in different sub-bands. Accordingly, equalization may improve performance of the spectral enhancer 450 when such a reference signal, rather than an estimate signal, is provided. In certain examples, settings (e.g., coefficients) of the equalization block 490 may be calculated (selected, adapted, etc.) when the user is not speaking, e.g., when the second voice estimate signal 456 is expected to be substantially composed of echo components, as is the echo reference signal 486.

For example, when a user is not speaking, each of the second voice estimate signal 456 and the echo reference signal 486 may represent substantially equivalent acoustic content (e.g., playback echo, which may include far end speech of a conversation partner, for instance), but having differing frequency responses due to differing processing, such that equalization settings calculated during the time of no user speech may improve operation of the spectral enhancer 550. Accordingly, settings of the equalization block 490 may be calculated when a voice activity detector indicates that the headphone user is not speaking (e.g., VAD=0), in some examples. When the user begins talking (e.g., VAD=1), settings of the equalization block 490 may be frozen. In some examples, the equalization block 490 may incorporate outlier rejection, e.g., throwing out data that seems unusual, and may enforce one or more maximum or minimum equalization levels, to avoid erroneous equalization and/or to avoid applying excessive equalization.

Figure 5A:
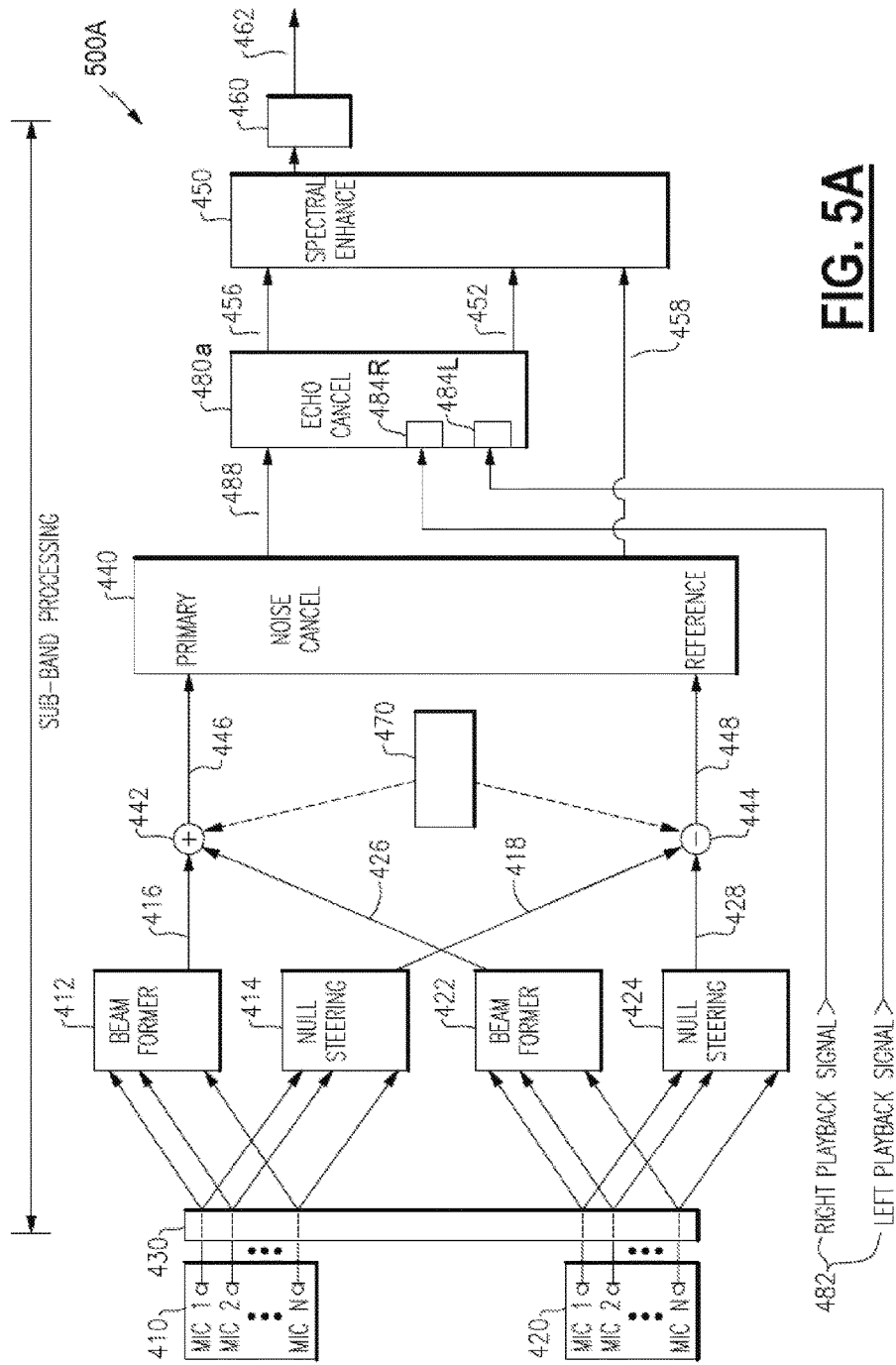
FIGS. 5A-5B are schematic diagrams of other example systems to enhance a user's voice signal among other signals.

FIG. 5A illustrates another example system 500A, which is similar to the system 400A but includes an echo canceller 480a having two echo reference signal inputs. Accordingly, in various examples, each of the right and left playback signals may be provided as a reference signal to such a dual-reference echo canceller 480a. Such a dual-reference echo canceller 480a may include right and left pre-filters 484R, 484L, operating similarly to the pre-filter 484 described above to match a static or nominal echo transfer function of the right and left sides, respectively. Further details of an example dual-reference echo canceller 480a are provided below with respect to FIG. 5C.

Figure 5B:
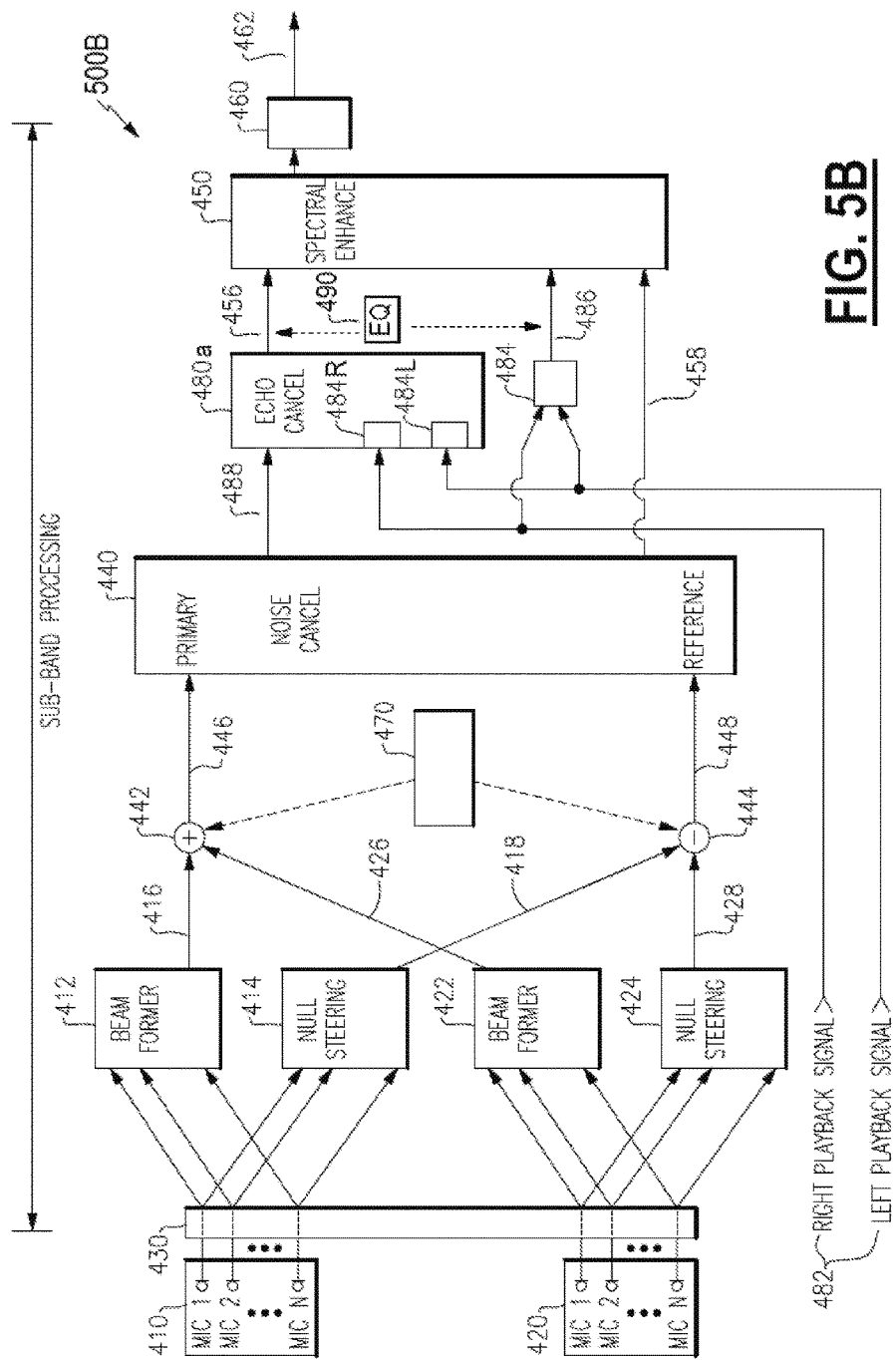

FIG. 5B illustrates another example system 500B, which is similar to the system 500A having a dual-reference echo canceller 480a. The system 500B provides the echo reference signal 486 to the spectral enhancer 450, and may include the equalization block 490 to provide equalization between the second voice estimate signal 456 and the echo reference signal 486, similar to that of the system 400B described above.

FIG. 5C illustrates an example dual-reference echo canceller 480a. The right and left playback signals 482R, 482L are received as echo reference signals and may be filtered by right and left pre-filters 484R, 484L, respectively, to match a nominal right and left echo transfer function, respectively. Right and left adaptive filters 510, 520 may provide adaptive filtering (e.g., to accommodate changing variation in the echo transfer path), to provide right and left echo estimates, which may be combined by a combiner 530 to provide an echo estimate signal 532. The echo estimate signal 532 is subtracted from the first voice estimate signal 488 to provide the second voice estimate signal 456. The second voice estimate signal 456 may be provided as an error signal to one or more adaptive algorithm(s) (e.g., NLMS) to update filter coefficients of the right and left adaptive filters 510, 520.

In various examples, a voice activity detector (VAD) may provide a flag to indicate when the user is talking, and the echo canceller 480a may receive the VAD flag, and may pause or freeze adaptation of the adaptive filters 510, 520 when the user is talking and/or soon after the user begins talking.

Figure 6:
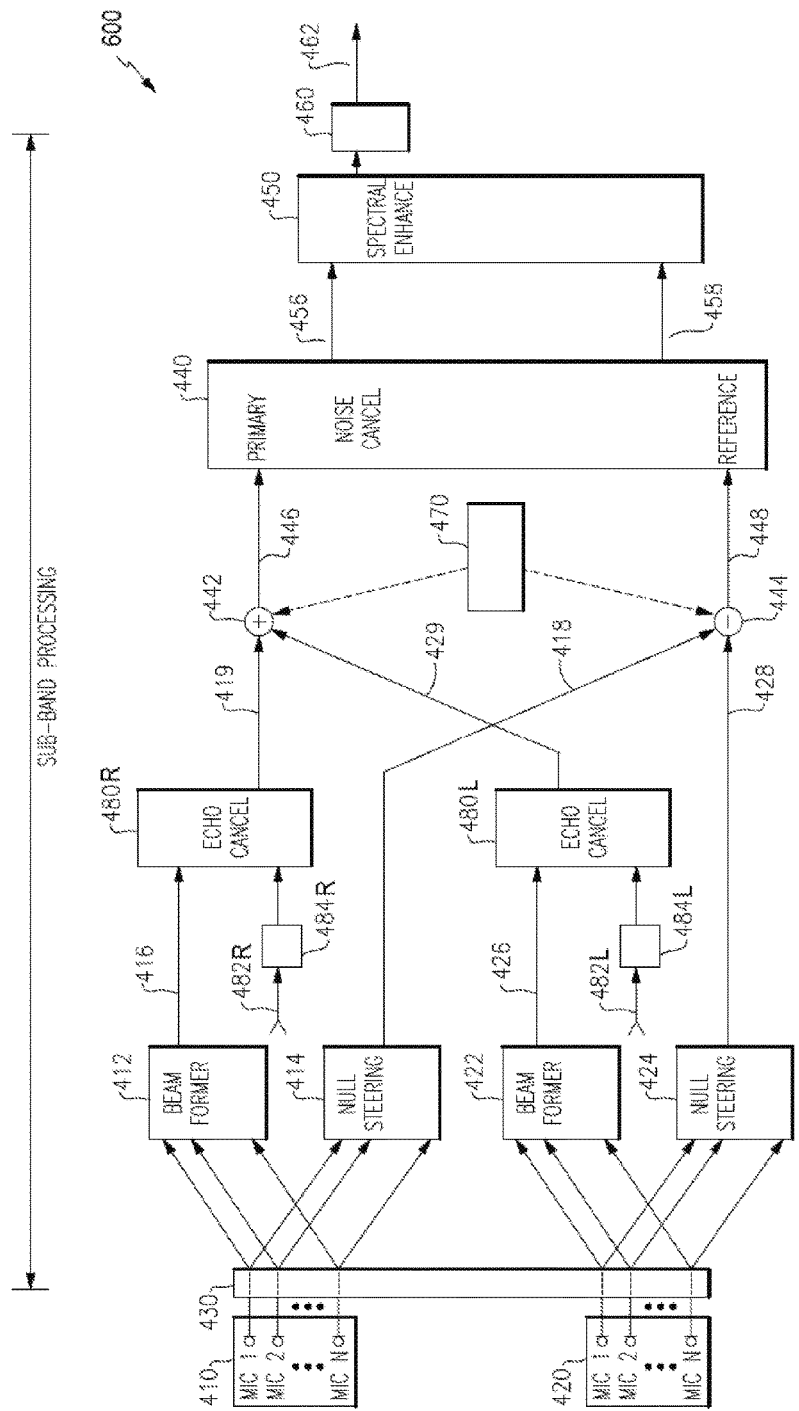
FIG. 6 is a schematic diagram of another example system to enhance a user's voice signal among other signals.

FIG. 6 illustrates another example system 600, which is similar to the system 400A but includes multiple echo cancellers 480, one of which operates on right-side signals and one of which operates on left-side signals. As discussed above with reference to FIG. 3, echo cancellation may be provided prior to noise cancellation, and the system 600 presents one such example for a binaural application. In the example system 600, a right echo canceller 480R operates on the right primary signal 416, with a right playback signal 482R as an echo reference signal. Similarly, a left echo canceller 480L operates on the left primary signal 426, with a left playback signal 482L as an echo reference signal. Each of the echo cancellers 480 removes or reduces from the respective primary signal 416, 426 components correlated to the respective playback signals 482. The right echo canceller 480R provides a right echo-reduced signal 419 and the left echo canceller 480L provides a left echo-reduced signal 429, and each of the right and left echo-reduced signals 419, 429 are received by the combiner 442. Accordingly, echo cancellation in the system 600 is provided prior to noise cancellation.

In various examples, an echo canceller may include a pre-filter similar to the pre-filter 484 and/or may operate on pre-filtered signals. As previously described, an echo reference signal may be a playback signal or may be a pre-filtered playback signal, and pre-filtering may include filtering that operates to match a fixed or nominal echo transfer function, such that the pre-filtered output is a first noise estimate, and the noise canceller (e.g., any of noise cancellers 480, 480R, 480L) may include adaptive filtering that may adapt to variations of the actual echo transfer function from the nominal echo transfer function, and may converge more quickly upon suitable filter coefficients at least in part due to the pre-filtering. In various examples, any of the noise cancellers 480, 480R, 480L may incorporate a pre-filter, such as the optional pre-filters 484R, 484L shown in FIG. 6, and in some examples the pre-filters 484R, 484L may be implemented as a set of nominal filter coefficients to be loaded in an adaptive filter upon startup, e.g., to match the expected nominal echo transfer function between an acoustic driver and one or more microphones.

In some examples, or some applications of certain examples, a system having two echo cancellers 480, one for a right side and another for a left side, such as in the system 600, may require more processing than, e.g., the system 400A having only one echo canceller 480, but such may provide more robust echo cancellation in some cases, such as a right playback signal 482R having substantially different content from a left playback signal 482L, e.g., the right and left playback signals being significantly uncorrelated.

Various examples may provide a combination of echo cancellation via a number of components. For example, some examples include a right and left echo canceller 480R, 480L as shown in FIG. 6, and also include an echo canceller 480 as shown in FIG. 4A, to provide two levels of echo control. Additionally or alternatively, some examples include a spectral enhancer 450 (or other post-filter) to reduce or remove echo components. Further additionally or alternatively, some examples may include a further echo control block acting upon the voice output signal 462 to provide echo reduction. For example, an echo canceller 480 may be located to operate on the voice output signal 462, or a spectral filter or various gain settings may be applied, which may depend upon frequency, by such an echo control block operating on the voice output signal 462, to reduce an effect or amount of echo content.

In some examples, echo control components, including echo canceller(s) 480 as shown, may be disabled based upon one or more system criteria, such as a detection that the echo content is low. Such operation may provide power and processor savings when echo cancellation is deemed unnecessary. In some examples, a system may determine that echo coupling is minimal, such as when passive attenuation, e.g., via a good fit on a user's head, is sufficient to reduce echo to an acceptable level, or when playback volume is low, or both, or other factors. The system may be configured to disable one or more echo control components, such as one or more echo canceller(s) 480 or spectral enhancer 450, in such cases.

In the example systems discussed above, primary signals may be provided with enhanced user voice components in part by using beam forming techniques. In certain examples, the beam former(s) (e.g., array processors 306, 412, 422) may use super-directive near-field beam forming to steer a beam toward a user's mouth in a headphone application. Certain examples of the beam formers discussed in the example systems herein implement super-directive techniques and take advantage of near-field aspects of the user's voice, e.g., that the direct path of a user's speech is a dominant component of the signals received by the (relatively few, e.g., two in some cases) microphones due to the proximity of the user's mouth, as opposed to noise sources that tend to be farther away and accordingly less dominant.

Also as discussed above, certain examples include a delay-and-sum implementation of the various null steering components (e.g., array processors 308, 414, 424). Further, conventional systems in a headphone application fail to provide adequate results in the presence of wind noise. Certain examples herein incorporate binaural weighting (e.g., by the weighting calculator 470 acting upon combiners 442, 444) to adjust or switch balance between sides, when necessary, to accommodate and compensate for wind conditions.

Accordingly, certain aspects and examples provided herein provide enhanced performance in a headphone/headset application by using one or more of super-directive near-field beam forming, delay-and-sum null steering, binaural weighting factors, or any combination of these.

Certain examples include variations to beam processing or other signal mixing. Some examples may implement two or more beam processors on one or more of the right and left sides, and may provide a primary signal (e.g., a right primary signal 416 and/or a left primary signal 426) as a mix or a selection of the outputs from the multiple beam processors. For example, the right beam processor 412 may include two beam processors that apply two different array processing techniques, such as MVDR for a first technique and delay-and-sum for a second technique, and in some cases the MVDR output may be selected/provided as the right primary signal 416 while in other cases (or at other times, under varying conditions) the delay-and-sum output may be selected/provided as the right primary signal 416. In various examples, signal energy content of two such array processing techniques may be the basis for detecting wind or other noise components, which may be taken into account in selecting which array processing output to provide as a primary signal (e.g., selecting which array processing technique may provide a better voice-to-noise and/or voice-to-echo ratio).

Various examples may include varying noise cancellation arrangements. For example, The noise canceller 440 may be configured to accept multiple noise reference signals, and each of the right and left reference signals 418, 428 may be provided to such a noise canceller, e.g., without mixing of combining into a combined reference signal 448. In some examples, the right and left reference signals 418, 428 may be individually provided to a noise canceller while a combined reference signal 448 may be provided as a noise estimate to the spectral enhancer 450, for example.

In various examples, wind detection capability may be and may provide one or more flags (e.g., indicator signals) to various components, which may respond to the indication of wind by, e.g., weighting the left or right side more heavily, switching to monaural operation, and/or freezing adaptation of various filters.

Further details of binaural beam forming selection, mixing, variations of binaural noise cancellation, and wind detection, that may be integrated with various binaural echo control as described herein, may be had with reference to related U.S. patent application Ser. No. 15/925,211 titled AUDIO SIGNAL PROCESSING FOR NOISE REDUCTION, filed on Mar. 19, 2018, and hereby incorporated by reference in its entirety for all purposes. Various examples may incorporate components and architectures described herein with those described in the related application, such as a combination of any of the systems 400A, 400B, 500A, 500B, 600, with those of FIGS. 5-10 of the related application.

In some examples, one or more delays may be included in one or more signal paths. In certain examples, such delays may accommodate a time delay for a VAD to detect user voice activity, e.g., so that a pause in adaptation occurs prior to processing a signal portion that includes the user voice component(s). In certain examples, such delays may align various signals to accommodate a difference in processing between two signals.

Certain examples may include a low power or standby mode to reduce energy consumption and/or prolong the life of an energy source, such as a battery. For example, and as discussed above, a user may be required to press a button (e.g., Push-to-Talk (PTT)) or say a wake-up command before talking. In such cases, example systems may remain in a disabled, standby, or low power state until the button is pressed or the wake-up command is received. Upon receipt of an indication that the system is required to provide enhanced voice (e.g., button press or wake-up command) the various components of an example system may be powered up, turned on, or otherwise activated. A brief pause may be enforced to establish weights and/or filter coefficients of an adaptive filter based upon background noise (e.g., without the user's voice) and/or echo, and/or to establish binaural weighting by, e.g., the weighting calculator 470, based upon various factors, e.g., wind or high noise from the right or left side. Additional examples include the various components remaining in a disabled, standby, or low power state until voice activity is detected, such as with a voice activity detection module.

One or more of the above described systems and methods, in various examples and combinations, may be used to capture the voice of a headphone user and isolate or enhance the user's voice relative to background noise, echoes, and other talkers. Any of the systems and methods described, and variations thereof, may be implemented with varying levels of reliability based on, e.g., microphone quality, microphone placement, acoustic ports, headphone frame design, threshold values, selection of adaptive, spectral, and other algorithms, weighting factors, window sizes, etc., as well as other criteria that may accommodate varying applications and operational parameters.

It is to be understood that any of the functions or methods and components of systems disclosed herein may be implemented or carried out in a digital signal processor (DSP), a microprocessor, a logic controller, logic circuits, and the like, or any combination of these, and may include analog circuit components and/or other components with respect to any particular implementation. Any suitable hardware and/or software, including firmware and the like, may be configured to carry out or implement components of the aspects and examples disclosed herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of enhancing speech of a headphone user, the method comprising:

receiving a primary signal derived from at least one microphone associated with the headphone, the primary signal configured to include a component of speech from the user;

generating an echo reference signal by pre-filtering at least one playback signal, the at least one playback signal provided by an audio source to be rendered into an acoustic signal by an acoustic driver associated with the headphone;

receiving a noise reference signal representative of acoustic noise in the environment of the headphone; and filtering the primary signal to reduce components correlated to the noise reference signal and to reduce components correlated to the echo reference signal, to provide a voice estimate signal.

2. The method of claim 1 wherein pre-filtering the at least one playback signal includes filtering by a set of pre-determined filter coefficients representative of a static echo transfer function.

3. The method of claim 1 wherein filtering the primary signal to reduce components correlated to the echo reference signal includes generating an estimated echo signal by filtering the echo reference signal using both a set of initial filter coefficients and a set of adapted filter coefficients, and subtracting the estimated echo signal from the primary signal.

4. The method of claim 1 wherein the primary signal is a right side primary signal and the echo reference signal is a right side echo reference signal and further comprising receiving a left side primary signal, receiving a left side echo reference signal, and filtering the left primary signal to reduce components correlated to the left side echo reference signal.

5. The method of claim 1 further comprising generating the primary signal by array processing a plurality of signals from a plurality of microphones to enhance a response to acoustic signals originating in the direction of the user's mouth.

6. The method of claim 1 further comprising generating the noise reference signal by array processing a plurality of signals from a plurality of microphones to reduce a response to acoustic signals originating in the direction of the user's mouth.

7. The method of claim 1 further comprising generating the primary signal by combining a first signal from a left side of the headphone with a second signal from a right side of the headphone.

8. The method of claim 1 wherein filtering the primary signal comprises filtering the echo reference signal to generate an estimated echo signal and subtracting the estimated echo signal from the primary signal.

9. The method of claim 7 wherein filtering the echo reference signal comprises adaptively adjusting filter coefficients during periods of time when a double talk condition is not detected.

10. An audio system, comprising:
at least one left microphone coupled to a left earpiece to provide a left primary signal;
at least one right microphone coupled to a right earpiece to provide a right primary signal; and
a signal processor configured to:
receive at least one playback signal,
derive an echo reference signal by pre-filtering the at least one playback signal,
provide a combined signal from the left and right primary signals,
provide a noise reference signal from the left and right primary signals, and
filter the combined primary signal to reduce components correlated to the noise reference signal and to reduce components correlated to the echo reference signal, to provide a voice estimate signal.

11. The audio system of claim 10 wherein the echo reference signal is derived by processing a plurality of playback signals, each of the plurality of playback signals to be rendered into an acoustic signal by at least one driver associated with the headphone system.

12. The audio system of claim 11 wherein processing the plurality of playback signals comprises selecting one of the plurality of playback signals based upon at least one of a playback volume, a wind noise component, and a balance parameter.

13. The audio system of claim 10 wherein pre-filtering the at least one playback signal comprises filtering by a set of pre-determined filter coefficients representative of a static echo transfer function.

14. The audio system of claim 10 wherein the signal processor is configured to filter the combined signal by filtering the noise reference signal to generate an estimated noise signal, filtering the echo reference signal to generate an estimated echo signal, and subtracting the estimated noise signal and the estimated echo signal from the combined signal.

15. A headphone comprising:
at least one microphone coupled to an earpiece to provide a microphone signal;
at least one input to receive a playback signal from an audio source;
at least one acoustic driver coupled to the earpiece and configured to convert the playback signal into an acoustic signal;
a noise reduction filter configured to receive a noise reference signal derived from the microphone signal and to provide an estimated noise signal;
a pre-filter configured to pre-filter the playback signal to derive an echo reference signal;
an echo cancellation filter configured to receive the echo reference signal derived from the playback signal and to provide an estimated echo signal; and
a signal processor configured to provide an estimated voice signal derived at least in part from the microphone signal, including subtracting the estimated noise signal and the estimated echo signal.

16. The headphone of claim 15 wherein the at least one microphone includes a plurality of microphones and the signal processor is configured to provide the estimated voice signal at least in part by array processing one or more signals from the plurality of microphones.

17. The headphone of claim 15 wherein the pre-filter comprises a set of pre-determined filter coefficients representative of a static echo transfer function.

18. The headphone of claim 15 wherein the at least one input includes a plurality of inputs to receive a plurality of playback signals and the signal processor is further configured to derive the echo reference signal by selecting one of the plurality of playback signals.

* * * * *